United States Patent [19]

Bostic

[11] Patent Number: 4,545,486
[45] Date of Patent: Oct. 8, 1985

[54] CONTAINER AND STORAGE SYSTEM FOR PHOTOGRAPHIC PRINTS AND NEGATIVES

[76] Inventor: Steve Bostic, 9830 Huntcliff Trace, Atlanta, Ga. 30338

[21] Appl. No.: 597,166

[22] Filed: Apr. 5, 1984

[51] Int. Cl.⁴ .................... B65D 85/62; B65D 85/48; B65D 1/36
[52] U.S. Cl. .............................. 206/455; 206/45.14; 206/45.19; 206/45.34
[58] Field of Search .................. 206/455, 387, 45.34, 206/45.19, 45.14, 456, 45.31; 220/4 E

[56] References Cited

U.S. PATENT DOCUMENTS

| | | | |
|---|---|---|---|
| 3,360,115 | 12/1967 | Joffe | 206/45.31 |
| 3,414,122 | 12/1968 | Runions | 206/47 |
| 3,710,900 | 1/1973 | Fink | 206/387 |
| 3,744,663 | 7/1973 | Moren | 206/45.19 |
| 4,095,694 | 6/1978 | Jost | 206/455 |
| 4,132,311 | 1/1979 | Glinert | 220/4 E |
| 4,415,079 | 11/1983 | Ackeret | 206/45.34 |

OTHER PUBLICATIONS

Texas Instruments Plastic Container.

*Primary Examiner*—William T. Dixson, Jr.
*Attorney, Agent, or Firm*—Workman, Nydegger & Jensen

[57] ABSTRACT

A container for storing photographic prints and negatives. Said container can be molded from sturdy semi-rigid material and includes a base and a lid. The base is constructed so that the interior of the base defines two open storage areas. One storage area is specifically adaptable to storing photographic negatives and subtends the other storage area which is specifically adaptable to storing photographic prints. Both negatives and prints can be stored in the same compartment of the same container yet they can be stored without allowing either the prints or the negatives an excess of space in which to move. These containers are also configured to be stored in a storage box which can hold several containers for easy access and attractive storage.

32 Claims, 10 Drawing Figures

CONTAINER AND STORAGE SYSTEM FOR PHOTOGRAPHIC PRINTS AND NEGATIVES

BACKGROUND

1. Field of the Invention

The present invention relates to a unique container for storing photographic prints and negatives which can be incorporated into a larger storage system.

The Prior Art

Various containers have been developed for use in storing and transporting photographic prints and negatives after the film has been processed. One of the primary problems encountered by all prior containers was how to store both prints, with typical dimensions of about 3×5 inches (or about 8.5 cm×12.5 cm), and strips of negatives with typical dimensions of about 1⅜×4 inches (or 3.5×10 cm), and potentially much larger. Indeed, strips of negatives could be as long as the entire roll of film.

The most commonly used method of storing and transporting prints and negatives is a simple envelope. The envelope is constructed so that it is wide enough to accommodate prints but at the same time is long enough to accommodate strips of negatives. As a result, both the prints and the negatives can potentially move about within the envelope and possibly become bent or creased, disorganized or even fall out of the envelope entirely.

Envelopes now commonly in use contain two interior compartments. These compartments are formed by a sheet of paper or other material which forms the envelope. The sheet is simply placed within the interior of the envelope so that the envelope is divided in half. This allows negatives to be placed in one compartment and prints to be placed in the other compartment. Even using the two compartment envelope, however, the prints and negatives can move within the envelope. There also exists the possibility that prints and negatives will be intermingled as they are removed from the envelope and subsequently replaced within the envelope because both compartments are identical in size and there is no indication as to which compartment holds negatives and which compartment holds prints.

Additional problems are encountered in storing and transporting prints and negatives in an envelope. Typical envelopes cannot be securely shut but rather depend on a simple flap in order to close. As a result the contents of the envelope are left exposed to dust and moisture. In the event the flap is lifted from the closed position the contents of the envelope are able to fall out.

The envelopes typically used for storing photographs and negatives are constructed of either paper or flexible plastic. Neither material is able to provide protection to the contents of the envelope. The envelope is easily bent, crushed and twisted with the resultant possibility of damage to the contents, particularly to finished prints. In addition, the configuration of such envelopes, especially while holding prints and negatives, is not adaptable to allow convenient storage and retrieval. Envelopes cannot be easily and neatly stacked, nor can they easily be placed into most types of conventional holders or storage systems.

A further problem with most conventional envelopes is that it is not possible to easily identify the contents. Typiclly, the material used to construct the envelopes is opaque so that none of the photographs can be seen. Thus, one must open the envelope and pull out one or more photographs in order to accurately identify which photographs are contained wihtin the envelope. It is of course possible to mark the exterior of the envelope for identification purposes, however, a more acceptable method of identification would be to view one of the actual photographs.

Generally, envelopes used to hold photographic prints are not attractive. When several envelopes are stored together the appearance is one of confusion and visual clutter.

One prior device which has attempted to solve the problem of safe and adequate storage as well as the adverse visual impact of envelopes was a simple sheet of scored paperboard. The paperboard sheet could be folded into a box or container when the need arose. The box had two compartments. One compartment was designed to hold a container for prints and the other compartment was designed to hold negatives. Typically, the box was folded up as it was loaded with a set of prints and negatives.

Several of the problems associated with envelopes remained with the folding paperboard box. The box, while more sturdy than an envelope, still was unable to adequately protect the contents. At the same time dust and moisture could easily reach the contents of the box. Unless a window was cut in the box to expose at least one print it was also impossible to see the contents of the box without opening. Therefore, the problem of identification remained.

Later attempts at providing an adequate container for prints and negatives used, as does the present invention, relatively rigid plastic materials. One such device employed a rectangular plastic box. The lid over the print compartment of the box pivoted and opened in a manner similar to that of typical cassette tape containers. The prints basically move with the lid of the device. Therefore, as the lid pivots the prints are lifted out of the container. On the opposite end of the device is a separate compartment and lid adapted to holding negatives.

Another device employing a plastic container included a mechanism whereby the prints could be slid out of one side of a plastic box. This device also included a spring mechanism whereby the prints were forced upwardly against the top of the plastic box while the box was closed. This together with the use of clear plastic for the top of the box allowed the prints inside the box to be identified.

Several problems remained with these plastic boxes. Primary among the problems with these devices is the lack of ease and convenience of access to the prints. In the case of the box employing the spring mechanism, the prints must be slid out of the narrow side of the box while the spring mechanism is at the same time forcing the prints upwardly against the top of the box. The portion of the box which slides out is also difficult to grasp and move. In the case of the device which resembles a cassette box all of the prints are pivoted with the lid each time the lid is opened. A person unfamiliar with this type of lid opening or not being attentive is prone to open the lid too quickly or incorrectly resulting in the contents being spewed out of the container. Thus, neither device is able to provide easy and convenient access to their contents.

An additional problem is that no previous container provided a completely satisfactory compartment for storing negatives. The box which resembles a cassette tape box has a separate compartment together with a separate lid to accommodate negatives. It is difficult to position the negatives within the box. The two ends of a strip of negatives are slid beneath the print compartment and a loop is formed at about the mid-point of the strip of negatives. This loop is then positioned within the special negative compartment. Such a system does not provide for ease in positioning the negatives within the box or in removing them.

The box which employs the spring mechanism described above makes no provision whatsoever for the storage of negatives. The negatives associated with the prints stored in the box must be stored separately. As a result, the chances of losing or misplacing the negatives is dramatically increased.

It is apparent that what is needed in the art is a means of storing photographic prints and negatives which overcomes the problems described above in the prior art. It would be an advancement in the art to provide a container which both protects prints and negatives from moisture, dust and crushing, while at the same time provides ease of access to the contents. It would also be an advancement in the art to provide a container which conveniently stores both prints and negatives and which does so without allowing the prints and negatives undue freedom of movement within the container. It would be a further advancement in the art to provide such a container which is attractive and can easily be incorporated into a storage system whereby multiple containers may be stored neatly and conveniently together. Such an apparatus is disclosed and claimed below.

BRIEF SUMMARY AND OBJECTS OF THE INVENTION

The present invention is a novel and unique container for use in storing photographic prints and negatives which can be incorporated into a multiple container storage system. It is expected that the basic container will be molded out of a thin but sturdy plastic material. The container is comprised primarily of a base and a lid. The base is molded so that a strip of negatives can fit into the bottom of the container and those negatives will not have an excess of space in which to move. The base will also allow prints to be placed in the container above the negatives. The prints also are held in place so that excessive lateral or longitudinal movement is prevented.

Within the container the negatives will subtend the prints thus allowing both prints and negatives to be securely stored within a single compartment of a single container. The container is provided with a simple lid which fits over the upper portion of the container base and which stays securely in place until it is lifted off. It is preferred that the lid will be constructed of clear plastic material so that the contents of the container can be easily viewed and identified.

The container may also have a paper or paperboard insert which fits between the lid and the base but which has its center cut out to continue to allow visual identification of the contents. The insert may be simply decorative or it may contain information of an instructional or advertising nature. In addition, it is expected that the paper insert will help reduce the tendency of the prints to stick to the lid in the event static electricity develops within the container.

The construction of the container allows prints and negatives to be stored without any significant chance of damage. The lid of the container, while easily removable, fits securely so that dust and moisture are effectively kept out of the container. In addition, the rigid plastic construction of the container prevents damage to the prints and negatives by crushing or twisting. It will be appreciated that because of the generally rectangular shape of the container and because it is constructed of relatively rigid material the container can be easily stacked. Further, the container may be incorporated into a larger system whereby a plurality of containers may be placed in a rack or larger storage container. This allows several sets of prints to be stored together neatly and conveniently.

It is therefore, a primary object of the present invention to provide an apparatus for efficiently and conveniently storing photographic prints and negatives.

More particularly, it is an object of the present invention to provide a container for storing photograhic prints and negatives which provides storage spaces which are approximately the same size as the prints and negatives so that the contents of the container are held securely in place.

Another object of the invention is to provide a container for storing photographic prints and negatives which provides ease of access and which allows the contents to be identified visually while the container is closed.

A further object of the invention is to provide a container for storing photographic prints and negatives which protects its contents from dust, moisture, bending, tearing and other types of damage and which is also easy and inexpensive to manufacture.

These and other objects of the invention will become apparent upon reading the following detailed description and appended claims, and upon reference to the accompanying drawings.

DETAILED DESCRIPTION OF THE PREFERRED EMBODIMENTS

Figure 1:
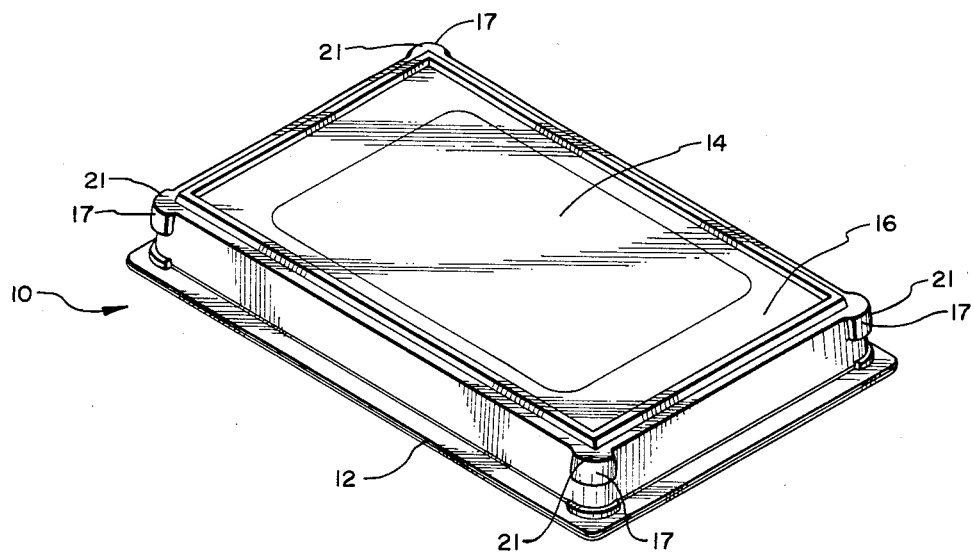
FIG. 1 is a perspective view of a preferred embodiment of the container of this invention in a closed position including the paper or paperboard insert.

The present invention can be best understood by reference to the drawings wherein like parts are designated with like numerals throughout. Referring more particularly to FIG. 1, the container of the present invention, generally designated 10, is shown. The present invention is a container 10 for storing photographic prints and negatives and is generally comprised of a base 12, a lid 14 and an optional paper or paperboard insert 16. Insert 16 may have a window cut out of its center to allow visual inspection of the interior of the container. The three pieces are combined to form a uniquely functional container for the storage of photographic prints and negatives.

FIG. 1 illustrates the container with lid 14 resting in a locked position on the top of base 12, with insert 16 interposed in its position. Base 12 is molded with ears 17 protruding slightly from each of its corners. Lid 14 has corresponding indentations 19 molded into its corners. As a result lid 14 can be easily and securely snapped on to base 12 and subsequently easily removed.

Figure 2:
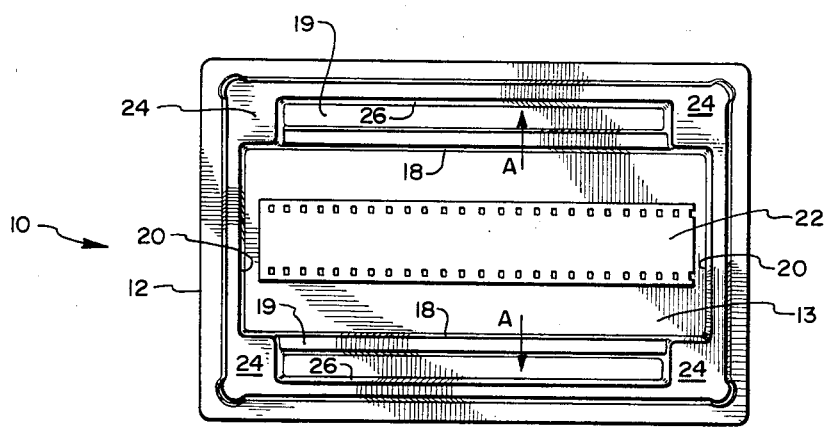
FIG. 2 is a top plan view of the base of the container illustrated in FIG. 1 with the lid and paper insert removed to reveal a strip of negatives placed in a negative trough.

As illustrated in FIG. 2, base 12 is molded in order to allow both prints and negatives to be easily, yet securely, positioned with a single compartment of a single container. Neither the prints nor the negatives will be allowed any substantial excess space in which to move about. This is accomplished by the unique design of the base 12 of the container 10.

Figure 6:
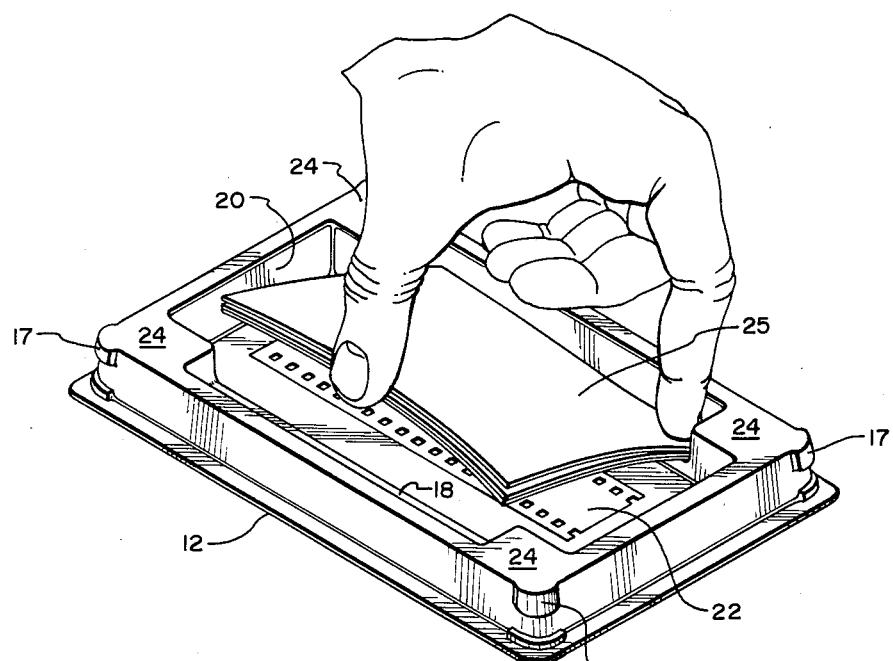
FIG. 6 is a front perspective view of the container illustrated in FIG. 1 with the lid and paper insert removed illustrating an alternative method of removing photographic prints from the container.

Referring to FIG. 2, base 12 is shown in detail. Base 12 has a floor 13 together with molded raised strips 18 which run the length of the print compartment of base 12 which is superimposed over a subtending negative trough 28. Raised strips 18 also help define channels 19 which are located in floor 13 which are created between raised strips 18 and the longitudinal inner walls 26 of base 12. The raised strips 18 and the transverse inner walls 20 of the base 12 define a storage trough 28 for the negatives. A strip of negatives 22 is illustrated in FIG. 2 positioned within base 12. The raised strips 18 are sufficiently elevated to allow the negatives 22 to rest on the floor 13 of container 10 while at the same time prints are able to rest on top of raised strips 18 as shown in FIG. 6. This can be done without any appreciable contact between the prints and negatives 22.

Base 12 also has molded into each corner generally square raised corners 24 as illustrated in FIGS. 2, 4, 5 and 6. Raised corners 24 are constructted so that they prevent excessive lateral movement by the photographic prints and negatives while they are resting in container 10. The raised corners 24 also act as a means for supporting and holding in place paper insert 16 which in turn separates the prints from the lid 14.

Figure 9:
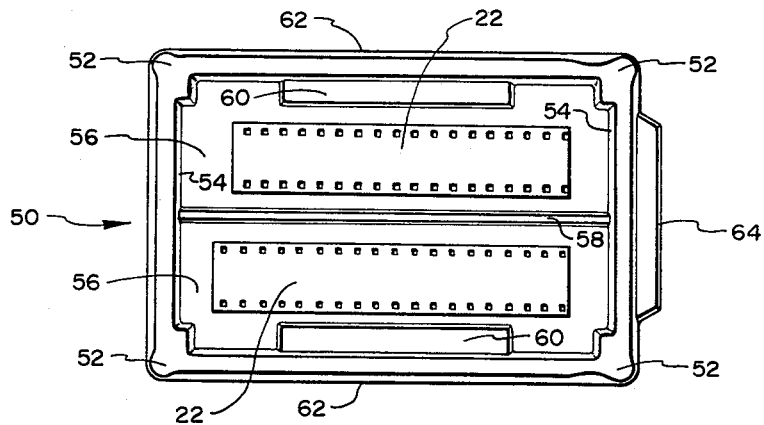
FIG. 9 is a top plan view of the base of the container illustrating an alternative embodiment of the present invention.
Figure 10:
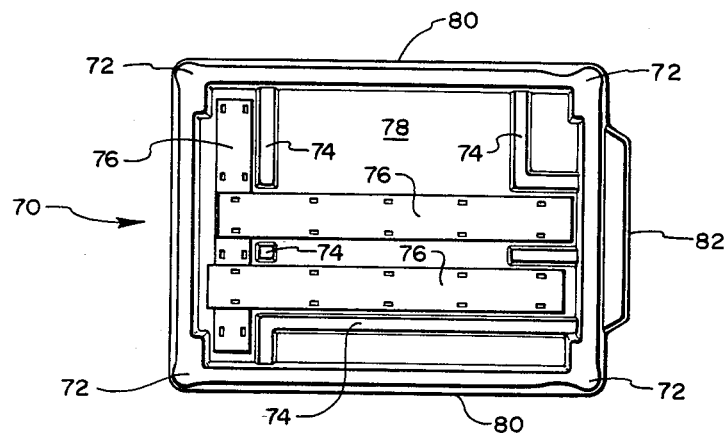
FIG. 10 is a top plan view of the base of the container illustrating an additional alternative embodiment of the present invention.

It will be appreciated that the base of the container can be configured in a variety of ways in order to be adaptable to various uses and for holding a variety of sizes of prints and negatives. FIGS. 9 and 10 illustrate alternative embodiments of the base of the container. However, both alternative embodiments employ the same concepts as used in the device illustrated in FIGS. 1 through 6.

FIG. 9 illustrates one alternative embodiment of the base of the device which is designated 50. As with the embodiment discussed above, this embodiment employs raised square corners 52, and the transverse inner walls 54 of the base 50 to help define two negative troughs 56. The negative troughs 56 are further defined by a long raised strip 58 which bisects the base 50 running parallel to the longitudinal walls 62 of base 50. Completing the boundaries of the negative troughs 56 are two shorter raised strips 60 which run parallel to and abut the longitudinal walls 62 of base 50.

As is illustrated in FIG. 9, base 50 is configured so that two sets of strips of 35 millimeter negatives 22 can rest side by side in the negative trough 56 which are molded into base 50. As with the device shown in FIGS. 1 through 6 a corresponding set of prints can be placed into base 50 and rest on top of raised strips 58 and 60. At the same time lateral and longitudinal movement by the prints will be limited by raised square corners 52 and longitudinal walls 62.

Another alternative embodiment of the container of the present invention is illustrated in FIG. 10. The base of this embodiment is generally designated 70. Base 70 is particularly adaptable to holding prints and negatives of the 110 film size or film disks. Again, however, base 70 is comprised of the same basic elements as those of the other embodiments of the device described above. This base 70 also has molded raised square corners 72. In addition, base 70 has molded into it a series of raised strips 74. These strips 74 are arranged in base 70 so that negatives 76 can rest in base 70 in a generally longitudinal direction, a generally transverse direction or, as illustrated in FIG. 10, in both directions simultaneously. In addition, base 70 has a relatively large open trough 78 generally defined by raised strips 74 and the longitudinal walls 80. This trough 78 is particularly adapted to receive a film disk.

Figure 5:
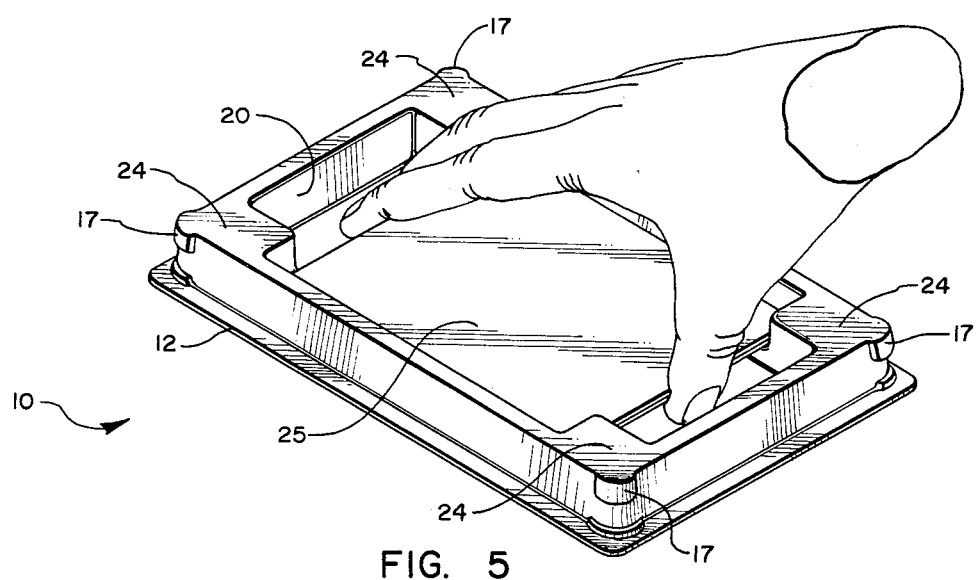
FIG. 5 is a perspective view of the container illustrated in FIG. 1 with the lid and paper insert removed illustrating one method of removing photographic prints from the container.

FIGS. 5 and 6 illustrate photographic prints 25 within base 12. Prints 25 will extend over and rest upon raised strips 18 thereby extending past raised corners 24 in the direction indicated by arrows A in FIG. 2. The area in which the prints are held is generally defined by raised corners 24 and the longitudinal inner walls 26 of base 12. This area is designed to be approximately the same size as the prints so that the prints are held reasonable securely within the container.

In contrast to prior storage containers both prints 25 and negatives 22 can be stored within the same compartment of the same container at the same time. As shown in FIGS. 2, 5 and 6, negatives 22 can be laid in the bottom of the container 10 within a trough 38 defined by transverse walls 20 and raised strips 18. The prints which correspond with that set of negatives can then be placed above the negatives. The prints, as discussed above, are held within the space defined by raised corners 24 and longitudinal walls 26. Furthermore, the prints rest on raised strips 18 so that they do not crush or put any pressure on the negatives 22 thereby reducing the likelihood of scratching or damaging the emulsion of the negative film. As an additional precaution against scratching the negatives 22 it may be desirable to place a tissue (not shown) between the negatives 22 and prints 25. An entire roll of film, including negatives 22 and prints 25, can easily be stored within a single container. Therefore, the possibility of misplacing the negatives 22 on prints 25 is minimized.

Figure 4:
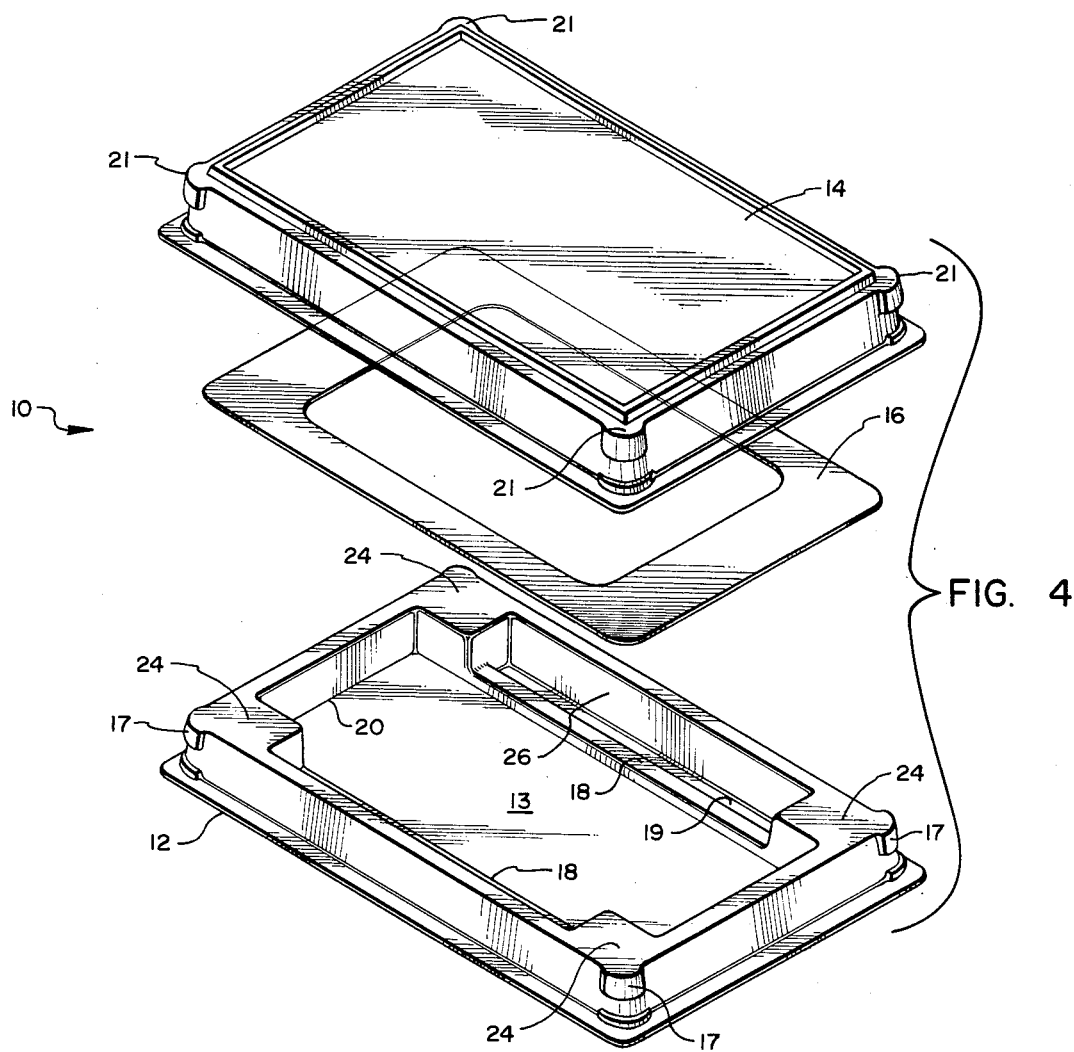
FIG. 4 is an exploded perspective view of the container illustrated in FIG. 1 showing the lid, the paper insert and the base.

FIGS. 4, 5 and 6 also illustrate the ease with which the prints 25 and negatives 22 are accessed. The present invention does not employ any complicated and cumbersome slide and spring mechanism, neither does it require that all of the prints be lifted out of the container each time the lid is opened. As illustrated in FIG. 4, lid 14 is simply lifted off base 12. In the event an insert 16 is used, insert 16 will also be lifted off base 12. Once this is accomplished prints 25 are readily accessible.

Figure 8:
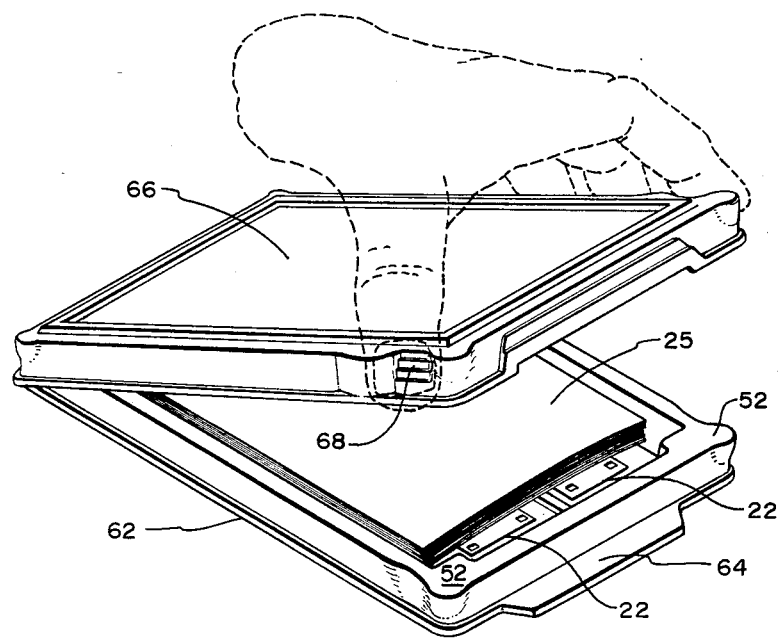
FIG. 8 is a front perspective view of an alternative embodiment of the device showing the lid in a partially open position.

FIG. 8 illustrates a possible alternative method of lifting the lid off of the container. The base of the container illustrated in FIG. 8 is the same as base 50 in FIG. 9. Base 50 has molded onto one end a tab 64. This tab 64 is particularly designed to aid in removing lid 66 from base 50. Lid 66 can be grasped with one hand, using grips 68 which are molded into lid 66. At the same time the user's other hand can press down on tab 64 thereby bending slightly base 50 and pivoting it downwardly. This allows lid 66 to be easily pivoted upwardly and removed from base 50. The embodiment illustrated in FIG. 10 includes a similar tab 82.

As illustrated in FIG. 5, once the lid is removed from the base prints 25 can be lifted out by grasping two edges of the prints 25 and simply lifting prints 25 out of the container. The container provides plenty of space between the edge of prints 25 and the transverse inner walls 20 so that removing the prints 25 is a simple procedure. An alternative method of removing prints 25 from the container 10 is by simply pressing on one corner of the print as illustrated in FIG. 6 thus tilting one edge of the print downwardly into channel 19. Once the opposite edge of the print pivots upwardly it is simple to grasp and remove the print from the container.

It can be seen, therefore, that the present invention allows prints and negatives to be easily placed within and easily removed from the container. There is no need to fold or roll the strips of negatives as was the case in many prior containers. In addition, the prints 25 are simply laid within the container and need not be slid into a narrow compartment or inserted into the lid of the container as was often the case in prior devices.

Figure 3:
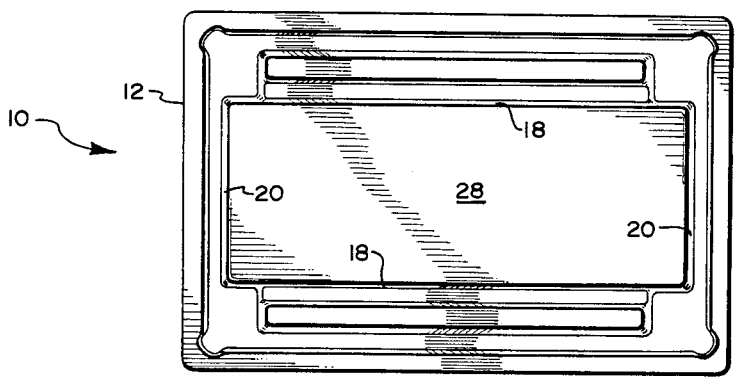
FIG. 3 is a bottom plan view of the container illustrated in FIG. 1 which reveals the molded structure of the base from its under side.

The floor 13 of base 12 of container 10 is illustrated in detail in FIG. 3. The raised strips 18 are shown as indentations. The trough 28 for holding the negatives 22 is illustrated as a raised portion in this particular view. As discussed above this trough is generally defined by raised strip 18 and the transverse inner walls 20. Generally, the base is constructed of a single sheet of molded plastic so that raised portions as shown in FIGS. 2 and 4, for example, are shown as indentations in FIG. 3. The contoured construction of base 12 provides in addition to appropriately sized storage areas, structural integrity which further allows base 12 to provide protection to its contents.

Referring again to FIG. 1 the invention can be seen with lid 14 in place. It is expected that lid 14 will be constructed of a clear plastic material. This will allow a print 25 to be seen while the container is closed. This also allows insert 16 to be seen while the lid is in place so that a user can read the information contained on insert 16 without being required to open the container. Insert 16, however, is expected to have a window cut of its center. This provides for easy identification of the contents of the container. The ability to view an actual point is the preferred method of identifying the contents of the container. In the present invention that method is available as well as the possibility of including identifying information on insert 16.

The container 10 of the present invention can be easily stored and can be incorporated into a larger storage system. The container 10 can be constructed so that the top of lid 14 and the bottom of base 12 correspond to allow a series of containers 10 to be easily and securely stacked. Since the containers are constructed of rigid plastic, Several containers 10 can be easily and neatly stacked one on top of another or stored on end.

Figure 7:
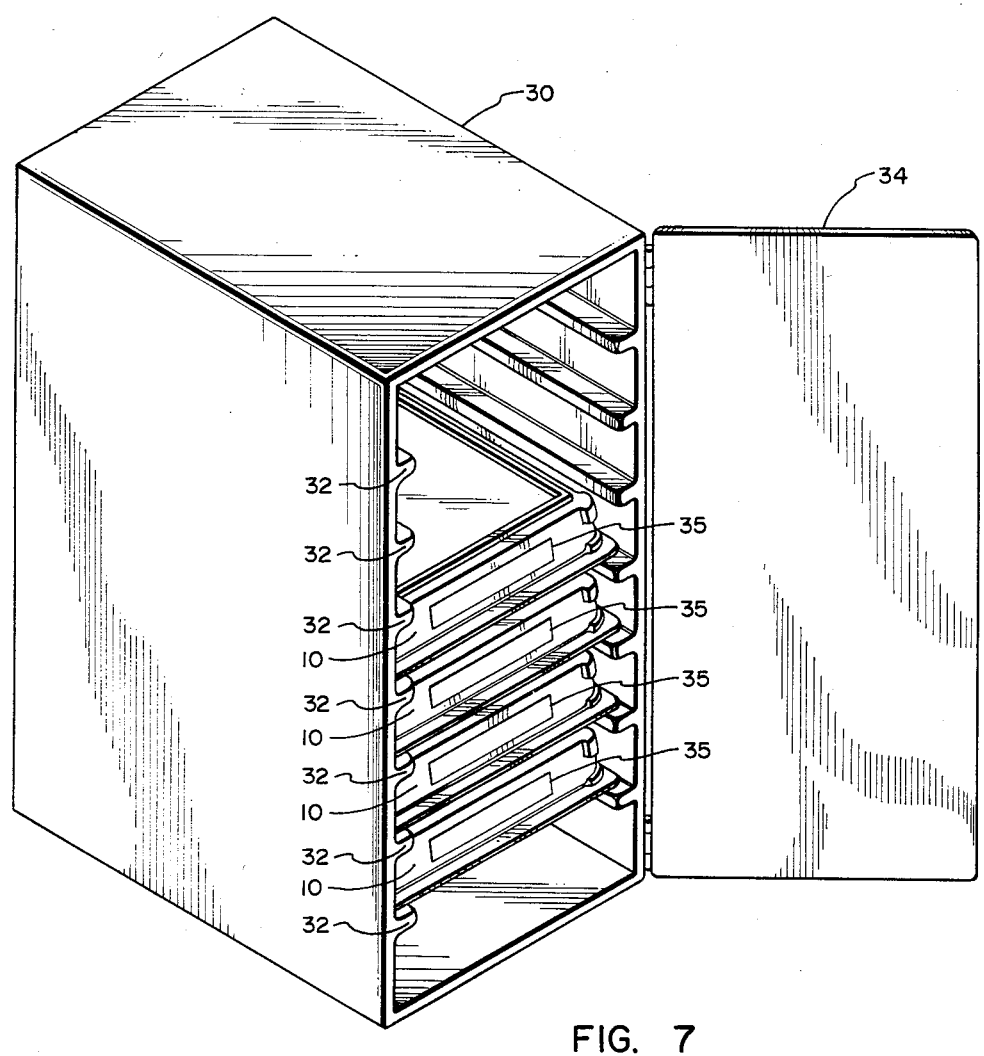
FIG. 7 is a front perspective view of a storage system incorporating containers of the type illustrated in FIGS. 1 through 6.

It is also anticipated that container 10 will be incorporated into a larger storage system. FIG. 7 illustrates a possible embodiment of one such system. The system could incorporate a typical storage box 30. The box 30 would be designed so that a plurality of containers 10 could be stacked within box 30 either adjacently or slid into box 30 along runners 32 in slightly spaced relation. Runners 32 would be positioned within box 30 so that containers 10 will rest on runners 32 and be appropriately positioned and spaced within box 30. Box 30 may also contain door 34 which can be opened or closed as desired. In addition, door 34 may contain a design so that the entire system is attractive when stored. Such a design may be a likeness of one or more books so that the container has the appearance of books stored on a book shelf. It will be appreciated that a large number of prints and negatives can be easily, neatly and efficiently stored in such a system.

In the event the containers 10 are incorporated into such a storage system it may be desirable to place identifying information on a sticker 35 attached to the outside of the container 10. FIG. 7 illustrates the use of such stickers 35. It will also be appreciated that the use of such stickers 35 could aid in the identification of groups of prints and negatives as they are processed and eventually distributed to customers at retail establishments. The use of such a means of identification would eliminate the need to thumb through a series of sets of prints and negatives in order to locate the one desired.

In summary, the present invention provides a simple and convenient means for storing photographic prints and negatives. The container 10 of the present invention is designed to provide storage space for both prints and negatives which conform to their size. The prints are stored in an area which approximates the size of a print and the negatives are stored in an area which approximates the size of a negative. Thus, prints and negatives can be stored together without allowing either an excess of space in which to move and without requiring that either be folded or inserted into a confined area and without taking up a large amount of storage space.

The container 10 of the present invention also protects its contents from damage. Moisture and dust are kept out of the container 10 because lid 14 fits securely on base 12. At the same time the contents are protected from bending or crushing by the rigid construction of the container 10. In addition, a plurality of various components of containers 10 can be neatly and compactly stored by incorporating them into a larger storage system such as one employing a storage box 30.

It will be appreciated that the apparatus and method of the present invention are capable of being incorporated in the form of a variety of embodiments, only a few of which have been illustrated and described above. The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A container for holding photographic prints and negatives, comprising:
    a substantially rectangular base having a contour which defines an interior area having transverse walls, longitudinal walls and a floor, said floor having at least one raised strip extending upwardly from the floor;
    a first area for storing photographic negatives within the interior area, said first area being defined by the floor and said raised strips which extend upwardly from the floor;
    a second area for storing photographic prints within the interior area, said second area extending into the interior area to the top edge of said raised strips and being defined by said transverse and longitudinal walls such that photographic prints are capable of resting between said walls upon said raised strips, said first area being distinct from said second area, said first and second areas being disposed within said interior area such that the first area subtends the second area thereby the interior area is a capable of simultaneously receiving for storage both photographic negatives and photographic prints; and
    a removable lid for securely covering the interior area of said base.

2. A container as defined in claim 1 wherein said lid is made of a transparent plastic material.

3. A container as defined in claim 1 wherein said base is made of semi-rigid plastic material.

4. A container as defined in claim 1 wherein said raised strips are spaced so that a strip of photographic negatives can rest on the floor between said raised strips or between one of said raised strips and one of the walls of said base.

5. A container as defined in claim 4 wherein said first area is further defined by the interior of the transverse walls of said base.

6. A container as defined in claim 4 wherein said second area is further defined by the raised corners of said base.

7. A container as defined in claim 1 further comprising an insert for disposition between said base and said removable lid, said insert having a window.

8. A container as defined in claim 1 wherein said base has ears which protrude slightly from its corners, which ears correspond to indentations in said lid such that said ears engage said indentations in snapping engagement to secure said lid onto said base.

9. A container as defined in claim 1 wherein said base further comprises a tab for grasping to aid in the removal of said lid from said base.

10. A container as defined in claim 1 wherein the contour of said base and the contour of said lid are adapted to allow a plurality of containers to be securely stacked on top of one another.

11. A container as defined in claim 1 wherein said first area is structured to hold the negatives of a film disk.

12. A container as defined in claim 1 further comprising at least one label for providing thereon printed or written information; said label being attached to the outside of said lid.

13. A container as defined in claim 1 further comprising at least one label for providing thereon printed or written information; said label being attached to the outside of said base.

14. A container as defined in claim 1 wherein said raised strips are spaced so that a strip of photographic negatives can rest on the floor between said raised strips.

15. A container as defined in claim 1 wherein the containers are configurated such a plurality of containers are capable of being stacked one upon another.

16. A container for holding photographic prints and negatives comprising:
    a substantially rectangular base having a contour which defines an interior area, said contour comprising transverse walls and longitudinal walls, a floor, raised corners within said interior area, and raised strips extending upwardly from the floor for restricting movement of photographic prints and negatives disposed simultaneously within the interior area;
    a transparent lid constructed to fit securely on said base over the interior area; and
    an insert for disposition between said base and said lid which rests on said raised corners.

17. A container as defined in claim 16 wherein said interior area comprises a first area for storage of photographic negatives and a second area for storage of photographic prints.

18. A container as defined in claim 17 wherein said first area subtends said second area.

19. A container as defined in claim 17 wherein said first area is a trough defined by the floor of said base, interior walls of said raised strips, and the interior of the transverse walls of said base.

20. A container as defined in claim 17 wherein said second area is a structure defined by the longitudinal walls of said base, the raised corners of said base, and the raised strips; wherein said structure is capable of holding or supporting photographic prints within the second area.

21. A container as defined in claim 17 wherein said first area is structured to hold the negatives of a film disk.

22. A container as defined in claim 16 wherein said lid is made of a transparent plastic material.

23. A container as defined in claim 16 wherein said base is made of semi-rigid plastic material.

24. A container as defined in claim 16 wherein said raised strips are spaced so that a strip of negatives can rest between said raised strips or between said raised strips and the walls of said base.

25. A container as defined in claim 16 wherein said base has ears which protrude slightly from its corners, which ears correspond to indentations in said lid such that said ears engage said indentations in snapping engagement to secure said lid onto said base.

26. A container as defined in claim 16 wherein said base further comprises a tab for grasping to aid in the removal of said lid from said base.

27. A container as further defined in claim 16 comprising at least one label for providing thereon printed or written information; said label being attached to said container.

28. A system for storing photographic prints and negatives comprising:
    at least one container comprising a substantially rectangular base having a contour which defines an interior area, having transverse walls, longitudinal walls and a floor, said floor having at least one raised strip extending upwardly from the floor;
    a first area for storing photographic negatives within the interior area, said first area being defined by the floor and said raised strips which extend upwardly from the floor;

a second area within the interior area, for storing photographic prints, said second area extending into the interior area to the top edge of said raised strips and being defined by said longitudinal and transverse walls such that photographic prints are capable of resting upon said raised strips, said first area being distinct from said second area wherein said first and second areas are disposed within said interior area such that the first area subtends the second area thereby the interior area is capable of simultaneously receiving for storage both photographic negatives and photographic prints;

a removable lid for securely covering the interior area of said base; and a box for holding a plurality of said containers.

29. A system as defined in claim 28 further comprising at least one label for providing thereon printed or written information; said label being attached to the outside of said base.

30. A system as defined in claim 28 further comprising at least one label for providing thereon printed or written information; said label being attached to the outside of said lid.

31. A system as defined in claim 28 further comprising a plurality of runners within said box for holding said containers in a slidable spaced relationship, thereby enabling said containers to be slid into and out of said box.

32. A container for holding photographic prints and negatives, comprising:

a substantially rectangular base having a contour which defines an interior area having transverse walls, longitudinal walls and a floor, said floor having at least one raised strip extending upwardly from the floor;

a first area for storing photographic negatives within the interior area, said first area being defined by the floor and said raised strips which extend upwardly from the floor;

a second area for storing photographic prints within the interior area, said second area extending into the interior area to the top edge of said raised strips and being defined by said transverse and longitudinal walls such that photographic prints are capable of resting between said walls upon said raised strips, said first area being distinct from said second area, said first and second areas are disposed within said interior area such that the first area subtends the second area thereby the interior area is capable of simultaneously receiving for storage both photographic negatives and photographic prints;

a removable lid for securely covering the interior area of said base; and a plurality of photographic negatives resting on said floor and disposed within said first area and a plurality of photographic prints resting on said raised strips and disposed within said second area.

* * * * *

UNITED STATES PATENT AND TRADEMARK OFFICE
CERTIFICATE OF CORRECTION

PATENT NO. : 4,545,486

DATED : October 8, 1985

INVENTOR(S) : Steve Bostic

It is certified that error appears in the above-identified patent and that said Letters Patent is hereby corrected as shown below:

Col. 2, line 2, "wihtin" should be --within--

Col. 5, line 52, "constructted" should be --constructed--

Col. 7, line 57, "cut of" should be --cut out of--

Col. 7, line 60, "point" should be --print--

Col. 9, line 22, "is a capable" should be --is capable--

Col. 10, line 4, "such a plurality" should be --such that a plurality--

Signed and Sealed this

Sixteenth Day of September 1986

[SEAL]

Attest:

DONALD J. QUIGG

Attesting Officer

Commissioner of Patents and Trademarks